United States Patent
Akiyama et al.

(10) Patent No.: US 9,908,469 B2
(45) Date of Patent: Mar. 6, 2018

(54) DRIVING SUPPORT DEVICE

(71) Applicant: TOYOTA JIDOSHA KABUSHIKI KAISHA, Toyota-shi (JP)

(72) Inventors: Tomonori Akiyama, Susono (JP); Yuji Ikedo, Nagaizumi-cho (JP); Ryo Morishita, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/295,476

(22) Filed: Oct. 17, 2016

(65) Prior Publication Data

US 2017/0158127 A1  Jun. 8, 2017

(30) Foreign Application Priority Data

Dec. 8, 2015  (JP) .................... 2015-239436

(51) Int. Cl.
*B60Q 1/00* (2006.01)
*B60Q 9/00* (2006.01)

(52) U.S. Cl.
CPC .................... *B60Q 9/008* (2013.01)

(58) Field of Classification Search
CPC ..................................... B60Q 9/008

USPC .................... 340/435, 436, 901–905, 937
See application file for complete search history.

(56) References Cited

U.S. PATENT DOCUMENTS

2007/0282532 A1* 12/2007 Yamamoto .......... B60R 21/0134
701/301

FOREIGN PATENT DOCUMENTS

JP         4992643        8/2012

* cited by examiner

*Primary Examiner* — Daryl Pope
(74) *Attorney, Agent, or Firm* — Oblon, McClelland, Maier & Neustadt, L.L.P.

(57) ABSTRACT

When a support ECU detects a crossing object approaching so as to cross a travel path toward which an own vehicle is heading, the support ECU calculates an object speed Vx, which is the speed of the crossing object. When the object speed Vx is more than a speed threshold Vref, the support ECU delivers an alert at a timing at which a margin period Tx becomes equal to or less than a time threshold Tref. On the other hand, when the object speed Vx is equal to or less than the speed threshold Vref, the support ECU alerts a driver at a timing at which a margin distance Dx becomes equal to or less than a distance threshold Dref.

4 Claims, 6 Drawing Sheets

DRIVING SUPPORT DEVICE

BACKGROUND OF THE INVENTION

1. Field of the Invention

The present invention relates to a driving support device for alerting a driver when an object, e.g., another vehicle is approaching so as to cross a travel path of an own vehicle.

2. Description of the Related Art

Hitherto, as proposed in Japanese Patent No. 4992643, there is a known collision prevention device for sending, at an intersection between a priority road and a non-priority road, an alert from a priority vehicle to a non-priority vehicle when the vehicle (priority vehicle) traveling on the priority road is entering the intersection, and the vehicle (non-priority vehicle) also entering the intersection from the non-priority road is detected. This device is configured to evaluate a degree of danger of collision between the priority vehicle and the non-priority vehicle, and increase an intensity of the alert as the danger increases.

The above-mentioned device is configured to alert a driver of the non-priority vehicle, for example, by sounding an alert from the priority vehicle to the non-priority vehicle. On the other hand, a driving support device is conceivable, which is configured to alert the driver of the own vehicle irrespective of whether the own vehicle is the priority vehicle or the non-priority vehicle when another vehicle is approaching so as to cross a travel path toward which the own vehicle is heading.

The driver is preferably alerted at a timing suitable for the feeling of the driver. A timing that is too early annoys the driver. Conversely, a timing that is too late prevents the original function from being fulfilled (a collision avoidance operation cannot be carried out in time). Thus, for example, it is conceivable to calculate an estimated period (referred to as margin period) until the another vehicle reaches a position at which the another vehicle crosses the travel path of the own vehicle, and the driver is alerted at a timing when the margin period becomes equal to or less than a threshold.

However, when the alert timing is determined by using the margin period, for example, in a case where the another vehicle is traveling at a low speed, the another vehicle is considerably close to the own vehicle when the driver is actually alerted. In this case, the driver feels that the timing for the alert is late.

SUMMARY OF THE INVENTION

The present invention has been made in view of the above-mentioned problem, and therefore has an object to alert a driver at an appropriate timing.

In order to achieve the above-mentioned object, a feature of one embodiment of the present invention resides in a driving support device, including:

object detection means (10, S11, S12, S13, 21, 22, 23, 24) for detecting an object approaching a travel path toward which an own vehicle is heading so as to cross the travel path;

alert means (10, S21, 30, 31, 32) for alerting a driver of the own vehicle at a predetermined timing when the object is detected;

margin distance acquisition means (S17) for acquiring a margin distance (Dx) representing a distance from a position of the object at a current time point to an estimated crossing position at which the object is estimated to cross the travel path toward which the own vehicle is heading;

travel speed acquisition means (S16) for acquiring a travel speed of the object;

margin period acquisition means (S19) for dividing the margin distance by the travel speed of the object, thereby acquiring a margin period representing an estimated period from the current time point to a time point at which the object reaches the estimated crossing position; and alert timing determination means (S20, S22) for selecting any one of a first timing at which the margin period becomes equal to or less than a time threshold and a second timing at which the margin distance becomes equal to or less than a distance threshold as the predetermined timing for the alert, in which the alert timing determination means is configured to select the first timing when a travel speed of the object is more than a predetermined value, and select the second timing when the travel speed of the object is equal to or less than the predetermined value.

The driving support device according to the one embodiment of the present invention includes the object detection means and the alert means. The object detection means is configured to detect an object approaching a travel path toward which an own vehicle is heading so as to cross the travel path. The object is mainly, for example, a vehicle, but may include a human. The object may be detected by, for example, a sensor installed on the own vehicle (the vehicle on which the driving support device is installed) and configured to detect an object existing in a periphery of the own vehicle, or by, for example, a receiver of the own vehicle configured to receive information (information on vehicles traveling on roads and the like) transmitted from a roadside device.

The alert means is configured to alert a driver of the own vehicle at the predetermined timing when the object is detected. The alert means may employ, for example, a buzzer, a voice announcement, a display (e.g., characters, marks, and images), and vibrations. The driver is preferably alerted at an appropriate timing. Thus, the present invention includes the margin distance acquisition means, the travel speed acquisition means, the margin period acquisition means, and the alert timing determination means.

The margin distance acquisition means is configured to acquire the margin distance representing the distance from the position of the object at the current time point to the estimated crossing position at which the object is estimated to cross the travel path toward which the own vehicle is heading. For example, the margin distance acquisition means is configured to acquire the travel path toward which the own vehicle is heading, the travel path toward which the object is heading, and the current position of the object, acquire the estimated crossing position, which is a crossing position of the two travel paths, and acquire the distance from the current position of the object to the estimated crossing position, thereby acquiring the margin distance.

The travel speed acquisition means is configured to acquire the travel speed of the object. The margin period acquisition means is configured to divide the margin distance by the travel speed of the object, thereby acquiring the margin period representing the estimated period from the current time point to the time point at which the object reaches the estimated crossing position.

The alert timing determination means is configured to select any one of the first timing at which the margin period becomes equal to or less than the time threshold and the second timing at which the margin distance becomes equal to or less than the distance threshold as the predetermined timing for the alert. In this case, the alert timing determination means is configured to select the first timing when the travel speed of the object is more than the predetermined value, and select the second timing when the travel speed of the object is equal to or less than the predetermined value.

The time threshold can be set to, for example, an appropriate period which enables the driver to carry out a collision avoidance operation with respect to the object (e.g., another vehicle) with time to spare based on the alert, and enables the driver not to be alerted too early (so that the driver is not annoyed). The distance threshold can be set to, for example, a distance which enables the driver to carry out the collision avoidance operation with time to spare, and secure a space between the own vehicle and the object to such a degree that the driver does not feel uncomfortable.

Thus, for example, when the object is traveling at a high speed, the driver is alerted at the first timing at which the margin period becomes equal to or less than the time threshold. As a result, even when the object is traveling at a high speed, the driver can carry out the collision avoidance operation based on the alert with time to spare. On the other hand, when the object is traveling at a low speed, the driver is alerted at the second timing at which the margin distance becomes equal to or less than the distance threshold. As a result, the driver is alerted under a state where the space between the own vehicle and the another vehicle is appropriately secured, and the driver can be prevented from feeling uncomfortable as much as possible. As a result, according to the present invention, the driver can be alerted at the appropriate timing depending on the travel speed of the object.

A feature of one aspect of the present invention resides in that the alert timing determination means includes speed determination means (S18) for determining whether or not the travel speed of the object is more than a speed threshold equal to the predetermined value, and is configured to select the first timing as the predetermined timing (S20) when the travel speed of the object is determined to be more than the speed threshold (Yes in Step S18), and select the second timing as the predetermined timing (S22) when the travel speed of the object is determined to be equal to or less than the speed threshold (No in Step S18).

According to the one aspect of the present invention, the speed determination means is configured to determine whether or not the travel speed of the object is more than the speed threshold equal to the predetermined value. The alert timing determination means is configured to select the first timing as the predetermined timing when the travel speed of the object is determined to be more than the speed threshold, and select the second timing as the predetermined timing when the travel speed of the object is determined to be equal to or less than the speed threshold. As a result, according to the one aspect of the present invention, the driver can be alerted at the appropriate timing depending on the travel speed of the object.

A feature of the aspect of the present invention resides in that the alert timing determination means is configured to select an earlier timing out of the first timing and the second timing as the predetermined timing.

According to the one aspect of the present invention, the alert timing determination means is configured to select the earlier timing out of the first timing and the second timing as the predetermined timing. For example, when the travel speed of the object is equal to the value acquired by dividing the distance threshold by the time threshold, the first timing and the second timing are simultaneously reached. On the other hand, when the travel speed of the object is more than the value acquired by dividing the distance threshold by the time threshold, the first timing is reached earlier. Conversely, when the travel speed of the object is less than the value acquired by dividing the distance threshold by the time threshold, the second timing is reached earlier.

The value acquired by dividing the distance threshold by the time threshold corresponds to the predetermined value according to the present invention. As a result, when the travel speed of the object is more than the predetermined value, the first timing is selected as the predetermined timing, and when the travel speed of the object is equal to or less than the predetermined value, the second timing is selected as the predetermined timing. As a result, according to the one aspect of the present invention, the driver can be alerted at the appropriate timing depending on the travel speed of the object.

In the above description, reference symbols used in an embodiment of the present invention are enclosed in parentheses and are assigned to each of the constituent features of the invention corresponding to the embodiment in order to facilitate understanding of the invention. However, each of the constituent features of the invention is not limited to the embodiment defined by the reference symbols.

DETAILED DESCRIPTION OF THE PREFERRED EMBODIMENTS

Figure 1:
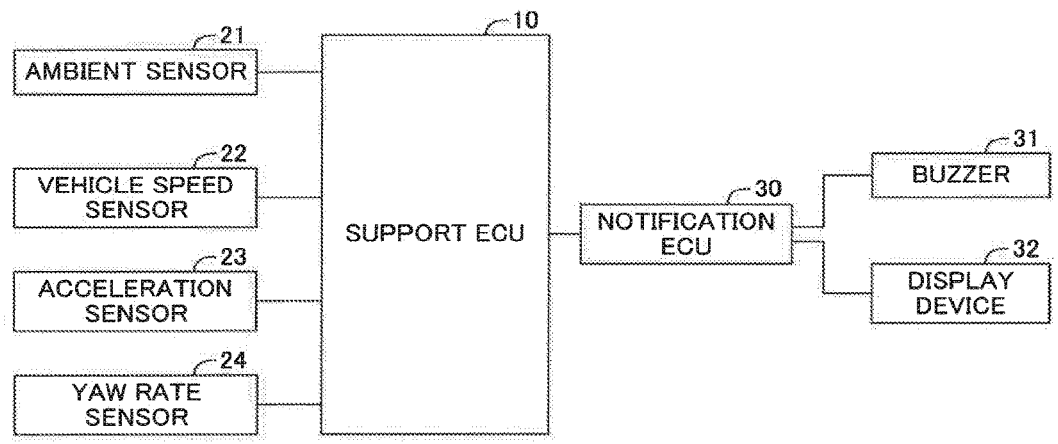
FIG. 1 is a schematic system configuration diagram for illustrating a driving support device according to an embodiment of the present invention.

Referring to the accompanying drawings, an embodiment of the present invention is described in detail below. FIG. 1 is a schematic system configuration diagram for illustrating a driving support device according to this embodiment.

The driving support device includes a support ECU 10 including a microcomputer as a main component. "ECU" is an abbreviation of electric control unit. The microcomputer herein includes a CPU and storage devices such as a ROM and a RAM, and the CPU is configured to implement various functions by executing instructions (programs) stored in the ROM. Moreover, the vehicle on which the driving support device is installed is referred to as "own vehicle" when the vehicle needs to be distinguished from other vehicles.

The support ECU 10 is connected to an ambient sensor 21, a vehicle speed sensor 22, an acceleration sensor 23, and a yaw rate sensor 24. The ambient sensor 21 is provided as means for acquiring information on 3D objects existing in a front side of the periphery of the own vehicle. The vehicle speed sensor 22, the acceleration sensor 23, and the yaw rate sensor 24 are provided as means for detecting a travel state of the own vehicle.

The ambient sensor 21 is, for example, a radar sensor. The radar sensor is configured to radiate a radio wave in the millimeter band (referred to as millimeter wave) to the periphery including at least the front side of the own vehicle, and detect, when a 3D object that reflects the millimeter wave exists in the radiation range, the distance to the 3D object, a relative speed with respect to the 3D object, and the direction of the 3D object through a reflected wave of the millimeter wave. The direction of the 3D object can be detected based on an angle of the reflected wave. The distance to the 3D object can be detected based on a period from the radiation of the millimeter wave to the return of the reflected wave. The relative speed with respect to the 3D object can be detected through the frequency change in the reflected wave (Doppler effect). Moreover, the size of the 3D object can also be estimated based on the reflected wave.

Figure 2:
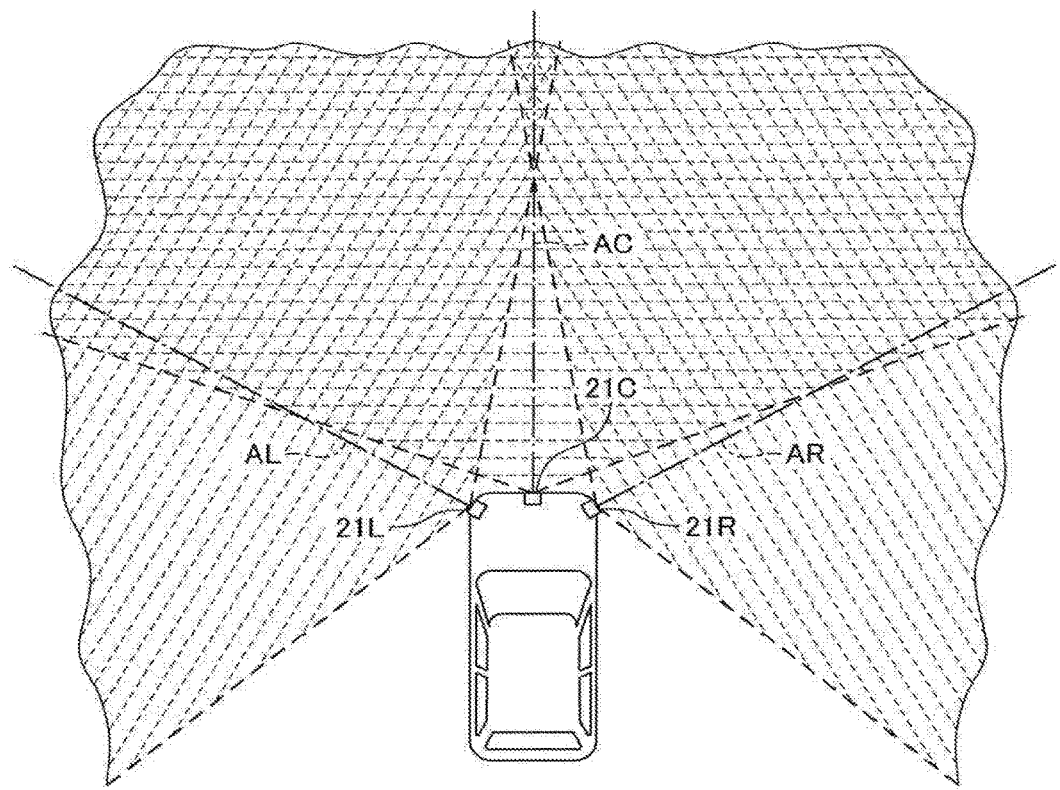
FIG. 2 is a plan view for illustrating ranges of a millimeter wave radiated by a radar sensor.

As illustrated in FIG. 2, the ambient sensor 21 includes, for example, radar sensor units 21C, 21L, and 21R installed at a total of three positions including a front center position, a front left position, and a front right position of the vehicle body. The radar sensor unit 21C at the front center position is configured to radiate the millimeter wave in a range of, for example, 75 degrees each in left and right sides of a radiation axis AC extending directly forward of the vehicle. The radar sensor units 21L and 21R provided on left and right front ends are respectively configured to radiate the millimeter waves in a range of 75 degrees each in left and right sides of radiation axes AL and AR extending outward by 60 degrees with respect to the front of the vehicle. The detection distance of each of the radar sensor units 21C, 21L, and 21R is about several tens to 100 meters. As a result, 3D objects existing at least on the front side of the periphery of the own vehicle can be detected.

The ambient sensor 21 is not limited to the radar sensor, and may be, for example, a camera sensor including a stereo camera configured to image the periphery including at least the front side of the own vehicle. Moreover, the ambient sensor 21 may be configured as a combination of a radar sensor and a camera sensor.

Information on the 3D objects acquired by the ambient sensor 21 is referred to as object information. The ambient sensor 21 is configured to repeat transmission of the object information to the support ECU 10 at a predetermined short cycle.

The vehicle speed sensor 22 is configured to detect the vehicle speed of the own vehicle, and transmit a detection signal of the vehicle speed to the support ECU 10. The acceleration sensor 23 is configured to detect a longitudinal acceleration, which is an acceleration acting in a longitudinal direction of the own vehicle, and a lateral acceleration, which is an acceleration acting in a lateral direction (vehicle width direction) of the own vehicle, and transmit a detection signal of the accelerations to the support ECU 10. The support ECU 10 is configured to compose the longitudinal acceleration and the lateral acceleration, thereby detecting the direction of an acceleration in a horizontal direction acting on the own vehicle, namely, the travel direction of the vehicle.

The yaw rate sensor 24 is configured to detect the yaw rate acting on the own vehicle, and transmit a detection signal of the yaw rate to the support ECU 10. The support ECU 10 is configured to calculate a turning radius of the own vehicle based on the vehicle speed detected by the vehicle speed sensor 22 and the yaw rate detected by the yaw rate sensor 24, and calculate, for estimation, a travel path (in an arc shape) toward which the own vehicle is heading based on the turning radius. The support ECU 10 is configured to estimate, when the yaw rate is zero, a straight path toward the direction of the acceleration detected by the acceleration sensor 23 as the travel path toward which the own vehicle is heading. Moreover, the support ECU 10 is configured to estimate, when the own vehicle is stopped, the travel path estimated immediately before the stop as the travel path toward which the own vehicle is heading.

As described above, the support ECU 10 is configured to acquire the object information, which represents the distance to the 3D object detected by the ambient sensor 21, the relative speed with respect to the 3D object, and the direction of the 3D object, at the predetermined cycle, and acquire the own vehicle information representing the vehicle speed of the own vehicle and the travel direction of the own vehicle at the predetermined cycle. Thus, the support ECU 10 can extract moving 3D objects (hereinafter referred to as moving objects) out of the detected 3D objects based on the relative relationships between the 3D objects and the own vehicle, and the vehicle speed and the travel direction of the own vehicle, and can calculate trajectories of the past movements of the moving objects, moving speeds of the moving objects at the current time point, and moving directions of the moving objects at the current time point.

The support ECU 10 is connected to a notification ECU 30. The driving support device is a device configured to notify, when a moving object approaches the travel path of the own vehicle so as to cross this travel path, the driver of the existence of the moving object, thereby enabling the driver to determine whether or not to carry out the collision avoidance operation so as to prevent the collision avoidance operation from being delayed. Thus, the support ECU 10 is configured to determine whether or not the moving object crosses the travel path of the own vehicle based on the travel path of the own vehicle and the travel direction of the moving object. Then, the support ECU 10 is configured to transmit an alert command for notifying the driver of the existence of the moving object to the notification ECU 30, when the moving object is estimated to cross the travel path of the own vehicle, at a predetermined timing described later.

The notification ECU 30 is connected to a buzzer 31 and a display device 32. The notification ECU 30 is configured to sound the buzzer 31 for alerting the driver, and display the existence of the moving object that is about to cross the travel path of the own vehicle on the display device 32 in accordance with the alert command transmitted from the support ECU 10. For example, the notification ECU 30 is configured to use a head-up display (not shown) to display an image enabling the driver to recognize the approaching direction of the moving object on a front windshield.

According to this embodiment, the buzzer 31 and the display device 32 are used to alert the driver, but only any one of the buzzer 31 and the display device 32 may be used for the alert. Moreover, in place of the buzzer 31, a voice message may be generated. Moreover, in place of the head-up display, another display, e.g., a meter display may be used. As a display form, a simple flickering display of a light, a display of characters and/or marks, or an image display through a dot matrix may be used. Moreover, in place of or in addition to the above-mentioned configuration, there may be provided such a configuration that a steering wheel or a driver's seat is vibrated to alert the driver.

The driving support device is configured to alert the driver when the moving object is estimated to cross the travel path of the own vehicle. However, when the timing of the alert is too early, the driver is annoyed. Conversely, when the timing of the alert is too late, the collision avoidance operation (a steering wheel operation and a brake pedal operation) performed by the driver may not be carried out in time. Thus, the timing of the alert needs to be set to an appropriate time point at which the driver can carry out a collision avoidance operation for the moving object with time to spare, and the driver is not alerted too early (so that the driver is not annoyed).

However, even at a timing that satisfies those conditions, for example, when the travel speed of the moving object is low, the driver may feel uncomfortable, e.g., feel that the timing of the alert is late. In other words, in the case where the travel speed of the moving object is low, even when the moving object is considerably close to the own vehicle, as long as there is enough time necessary for the collision avoidance operation, the alert is not started. In this case, there is no problem in terms of the collision avoidance operation, but the driver is not alerted even when the moving object has entered the own field of view, and the driver thus feels that the timing of the alert is late.

Figure 3:
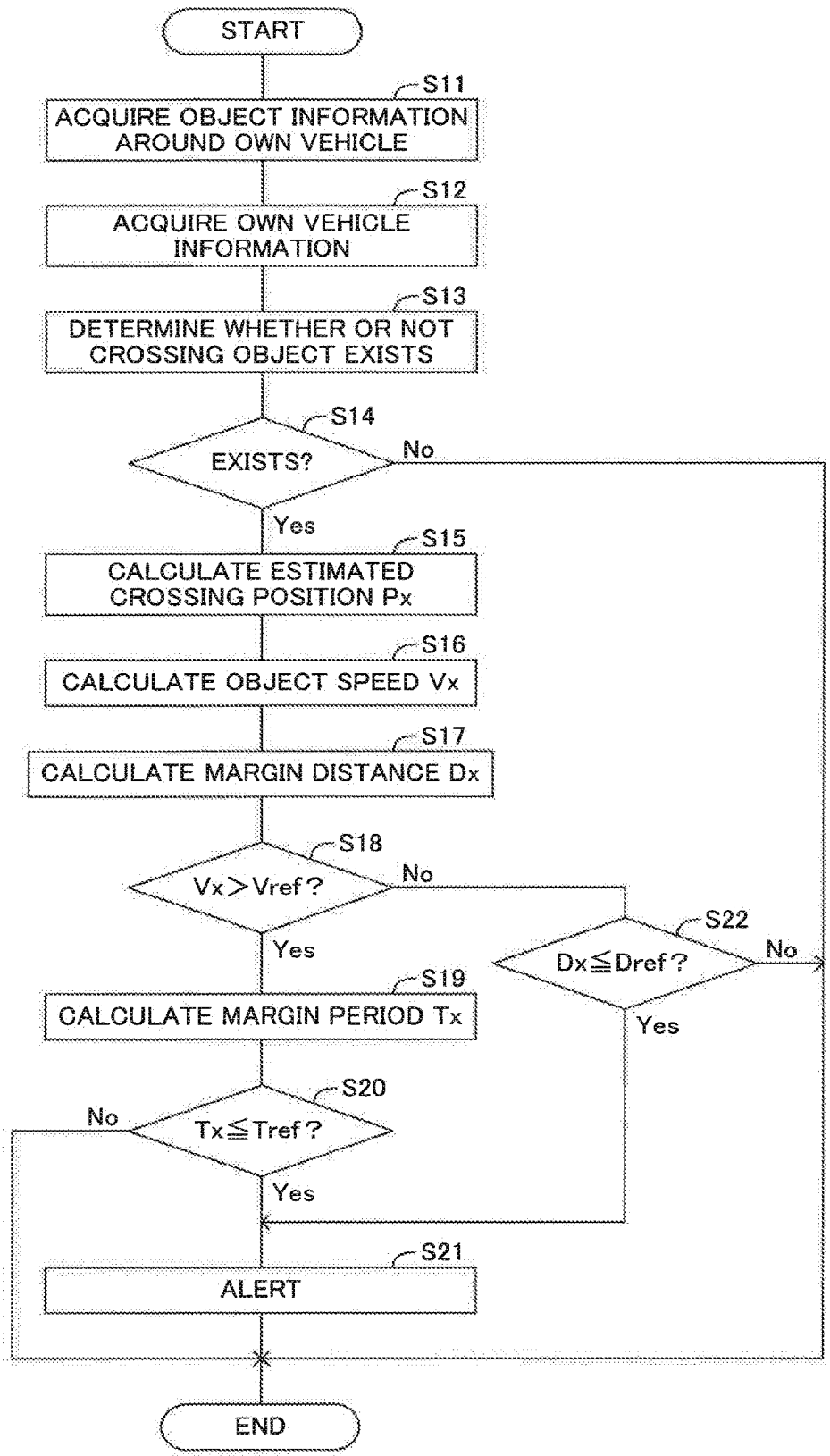
FIG. 3 is a flowchart for illustrating a crossing alert control routine.

Thus, in the driving support device according to this embodiment, the timing of the alert is set so that the driver does not feel uncomfortable. A description is now given of processing of setting the alert timing. FIG. 3 is a flowchart for illustrating a crossing alert control routine executed by the support ECU 10. This crossing alert control routine is repeated at a predetermined short calculation cycle while an ignition switch is turned on.

When the crossing alert control routine is started, in Step S11, the support ECU 10 acquires the object information, which is the information on the 3D objects in the periphery of the own vehicle detected by the ambient sensor 21. Then, in Step S12, the support ECU 10 acquires the own vehicle information representing the vehicle speed, the acceleration, and the yaw rate respectively detected by the vehicle speed sensor 22, the acceleration sensor 23, and the yaw rate sensor 24 respectively.

Then, in Step S13, the support ECU 10 determines whether or not a moving object (car, bicycle, and pedestrian hereinafter referred to as crossing object) exists around the own vehicle, and approaches the travel path of the own vehicle so as to cross this travel path based on the object information and the own vehicle information. In this case, the support ECU 10 determines, when a moving object is detected, whether or not the moving object crosses the travel path of the own vehicle based on the travel direction of the moving object and the travel path of the own vehicle.

Figure 4:
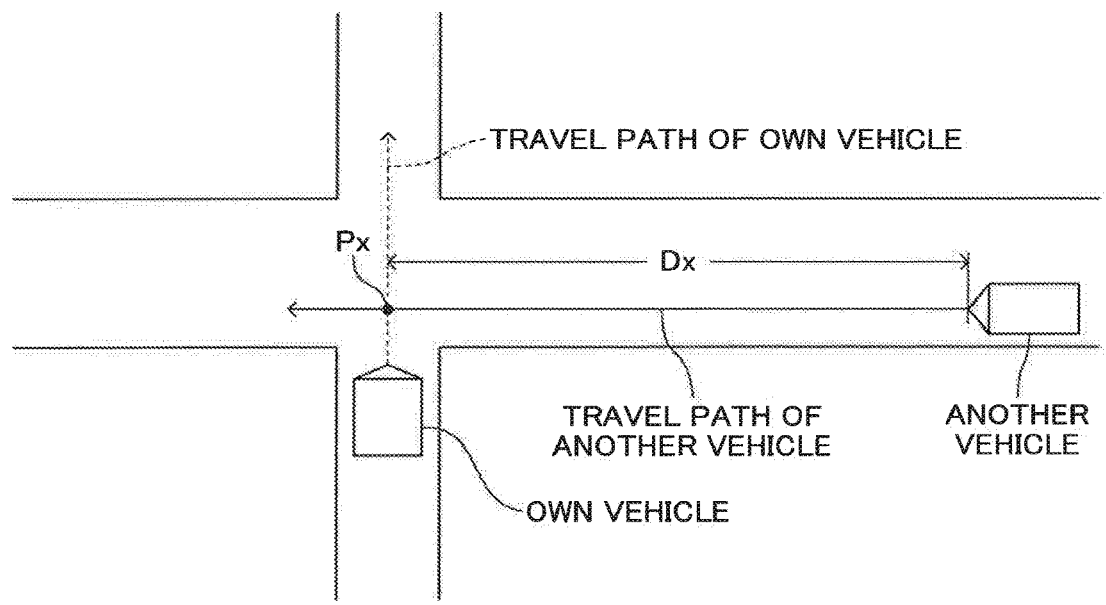
FIG. 4 is an explanatory diagram for illustrating a crossing object, an estimated crossing position Px, and a margin distance Dx.

For example, as illustrated in FIG. 4, when the own vehicle is entering an intersection, and there exists another vehicle entering the intersection from a road crossing the road on which the own vehicle is traveling, the another vehicle is detected as a crossing object. This crossing object corresponds to an object detected by object detection means according to the present invention.

When the support ECU 10 determines that a crossing object does not exist (No in Step S14), the support ECU 10 finishes this routine temporarily. The support ECU 10 repeats this processing. When the support ECU 10 detects a crossing object (Yes in Step S14), the support ECU 10 proceeds to Step S15.

In Step S15, the support ECU 10 calculates the travel path of the own vehicle and the travel path of the crossing object, and calculates a position (referred to as estimated crossing position Px) at which both the travel paths cross each other. Then, in Step S16, the support ECU 10 calculates an object speed Vx representing the travel speed of the crossing object at the current time point based on the relative relationship between the crossing object and the own vehicle, and the own vehicle information.

Then, in Step S17, the support ECU 10 calculates a margin distance Dx representing a distance from the position of the crossing object at the current time point to the estimated crossing position Px.

Then, in Step S18, the support ECU 10 determines whether or not the object speed Vx is more than a speed threshold Vref. When the object speed Vx is more than the speed threshold Vref, the support ECU 10 proceeds to Step S19. When the object speed Vx is equal to or less than the speed threshold Vref, the support ECU 10 proceeds to Step S22.

In Step S19, the support ECU 10 calculates a margin period Tx representing an estimated period from the current time point to an arrival of the crossing object at the estimated crossing position Px. This margin period Tx is calculated on the assumption that the object keeps traveling at the travel speed at the current time point. Thus, the margin period Tx is calculated by dividing the margin distance Dx by the object speed Vx (Tx=Dx/Vx).

Then, in Step S20, the support ECU 10 determines whether or not the calculated margin period Tx is equal to or less than a time threshold Tref. When the margin period Tx is more than the time threshold Tref, the support ECU 10 finishes this routine temporarily. This time threshold Tref is a period for setting the timing of the alert, and is set to an appropriate period which enables the driver to carry out the collision avoidance operation for the crossing object with time to spare based on the alert, and enables the driver not to be alerted too early (so that the driver is not annoyed). A timing at which the margin period Tx becomes equal to or less than the time threshold Tref corresponds to a first timing according to the present invention.

Thus, when, in Step S20, the support ECU 10 makes a determination of "No", the current time point is too early as the timing for the alert, and the support ECU 10 thus finishes this routine temporarily, and repeats the above-mentioned processing.

The margin period Tx decreases as time elapses. When the margin period Tx becomes equal to or less than the time threshold Tref (Yes in Step S20), in Step S21, the support ECU 10 transmits the alert command to the notification ECU 30. When the notification ECU 30 receives the alert command, the notification ECU 30 sounds the buzzer 31, and displays an alert display indicating the approach of the crossing object on the display device 32. As a result, the driver can recognize the approach of the crossing object, and can carry out the collision avoidance operation as necessary.

On the other hand, when, in Step S18, the object speed Vx is equal to or less than the speed threshold Vref, in Step S22, the support ECU 10 determines whether or not the margin distance Dx is equal to or less than a distance threshold Dref. When the margin distance Dx is more than the distance threshold Dref, the support ECU 10 finishes this routine temporarily. A timing at which the margin distance Dx becomes equal to or less than the distance threshold Dref corresponds to a second timing according to the present invention. The distance threshold Dref is a distance for setting the timing for the alert, and is set to a distance which enables the driver to can carry out the collision avoidance operation with time to spare, and secure a space between the own vehicle and the another vehicle to such a degree that the driver does not feel uncomfortable. For this setting, the distance threshold Dref is set to such a value that, when the object speed Vx is equal to or less than the speed threshold Vref, the margin distance Dx becomes equal to or less than the distance threshold Dref (the second timing according to the present invention is reached) before the timing at which the margin period Tx becomes equal to or less than the time threshold Tref (the first timing according to the present invention is reached).

When, in Step S22, the support ECU 10 makes a determination of "No", the current time point is too early as the timing for the alert, and the support ECU 10 thus finishes this routine temporarily, and repeats the above-mentioned processing.

The margin distance Dx decreases as time elapses. When the margin distance Dx becomes equal to or less than the distance threshold Dref (Yes in Step S22), in Step S21, the support ECU 10 transmits the alert command to the notification ECU 30. As a result, the notification ECU 30 sounds the buzzer 31, and displays the alert display indicating the approach of the crossing object on the display device 32. As a result, the driver can recognize the approach of the crossing object, and can carry out the collision avoidance operation as necessary.

In Step S21, the support ECU 10 transmits the alert command, and then finishes this routine temporarily. Since this routine is repeated at a predetermined calculation cycle, when the crossing object passes the estimated crossing position Px, the determination in Step S14 becomes "No", and the driver is thus no longer alerted.

With the above-mentioned driving support device according to this embodiment, the parameter used to determine the alert timing is switched between the margin period Tx and the margin distance Dx depending on whether or not the object speed Vx is more than the speed threshold Vref.

Figure 5:
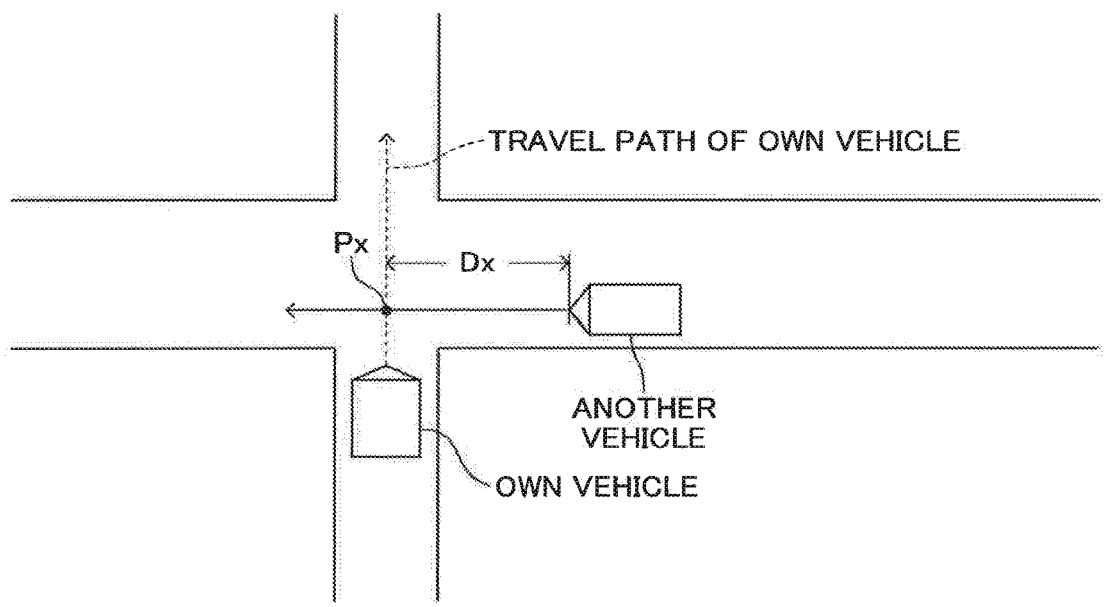
FIG. 5 is an explanatory diagram for illustrating a problem in a case where an alert timing is determined only based on a margin period Tx.

For example, when the alert timing is determined only based on the margin period Tx, in the case where the crossing object is traveling at a low speed, as illustrated in FIG. 5, even when the crossing object is considerably close to the own vehicle, the alert is not started as long as there exists enough time required for the collision avoidance operation. In this case, there is no problem in terms of the collision avoidance operation, but the driver is not alerted even when the crossing object has entered the own field of view, and the driver feels that the timing of the alert is late.

In contrast, according to this embodiment, when the object speed Vx is more than the speed threshold Vref, the driver is alerted at the first timing at which the margin period Tx becomes equal to or less than the time threshold Tref. When the object speed Vx is equal to or less than the speed threshold Vref, the driver is alerted at the second timing at which the margin distance Dx becomes equal to or less than the distance threshold Dref. Thus, in a case where the crossing object is traveling at a low speed (Vx≤Vref), even when the margin period Tx is sufficiently secured, the driver is alerted at the time point at which the margin distance Dx becomes equal to or less than the distance threshold Dref, and the driver can be alerted under a state where the space between the own vehicle and the crossing object is appropriately secured. As a result, the driver can be prevented from feeling uncomfortable. Moreover, in a case where the crossing object is traveling at a high speed (Vx>Vref), the driver is alerted at the time point when the margin period Tx becomes equal to or less than the time threshold Tref, and the driver can thus carry out the collision avoidance operation with time to spare.

<Modified Example of Crossing Alert Control Routine>

A description is now given of a modified example of the crossing alert control routine. In the crossing alert control routine according to the embodiment, the parameters (margin period and margin distance) used to determine the timing for the alert are switched depending on the object speed Vx. In contrast, according to this modified example, out of the first timing at which the margin period Tx becomes equal to or less than the time threshold Tref and the second timing at which the margin distance Dx becomes equal to or less than the distance threshold Dref, the driver is alerted at the earlier timing.

Figure 6:
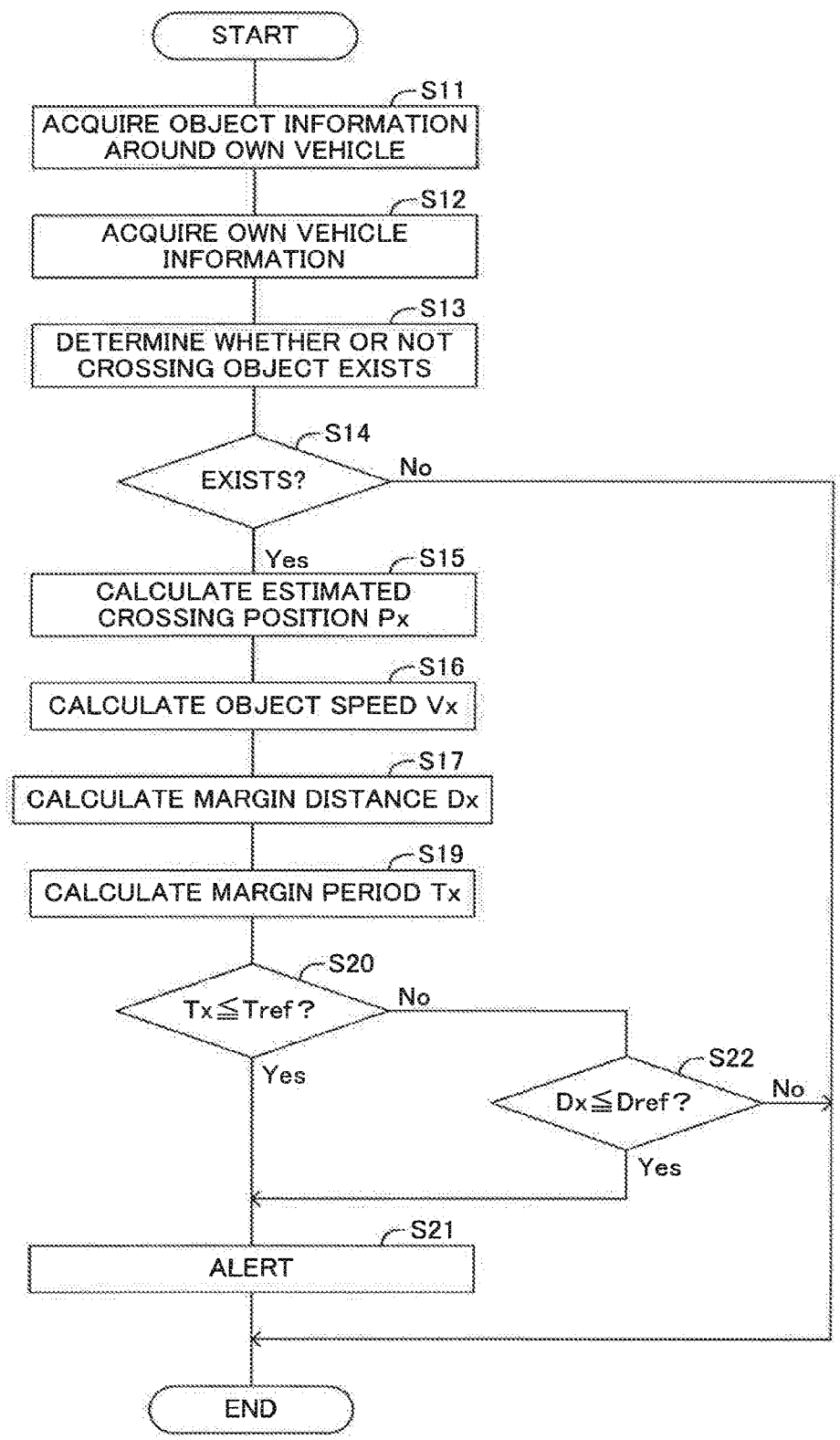
FIG. 6 is a flowchart for illustrating the crossing alert control routine according to a modified example of the present invention.

FIG. 6 is a flowchart for illustrating the crossing alert control routine according to the modified example. The same processing as that of the crossing alert control routine (FIG. 3) according to the embodiment is denoted by the same step numbers, and a description thereof is therefore omitted.

The support ECU 10 determines the absence/presence of a crossing object through the processing in Steps S11 to S13. When a crossing object is detected (Yes in Step S14), the support ECU 10 carries out the processing in Steps S15 to S17 and S19, thereby calculating the margin distance Dx and the margin period Tx.

Then, in Step S20, the support ECU 10 determines whether or not the margin period Tx is equal to or less than the time threshold Tref. When the margin period Tx is more than the time threshold Tref (No in Step S20), in Step S22, the support ECU 10 determines whether or not the margin distance Dx is equal to or less than the distance threshold Dref. When the margin period Tx is more than the time threshold Tref, and the margin distance Dx is more than the distance threshold Dref, the current time point is too early as the timing for the alert, and the support ECU 10 thus finishes this routine temporarily. The time threshold Tref and the distance threshold Dref may be the same as those values used in the crossing alert control routine according to the embodiment.

The support ECU 10 repeats this processing at a predetermined calculation cycle. When the margin period Tx becomes equal to or less than the time threshold Tref (Yes in Step S20), or the margin distance Dx becomes equal to or less than the distance threshold Dref (Yes in Step S22), the support ECU 10 proceeds to Step S21, and transmits the alert command to the notification ECU 30.

Thus, when a condition of the logical OR of the first condition that the margin period Tx becomes equal to or less than the time threshold Tref and the second condition that the margin distance Dx becomes equal to or less than the distance threshold Dref is satisfied, the driver is alerted. In other words, at the earlier timing out of the first timing at which the margin period Tx becomes equal to or less than the time threshold Tref and the second timing at which the margin distance Dx becomes equal to or less than the distance threshold Dref, the driver is alerted.

Thus, for example, when the crossing object is traveling at a high speed, the driver is alerted at the first timing at which the margin period Tx becomes equal to or less than the time threshold Tref. On the other hand, when the crossing object is traveling at a low speed, the driver is alerted at the second timing at which the margin distance Dx is equal to or less than the distance threshold Dref. As a result, according to one aspect of the present invention, the driver is alerted at the appropriate timing depending on the travel speed of the crossing object, and the driver can be prevented from feeling uncomfortable. Moreover, the driver can carry out the collision avoidance operation with time to spare.

The relationship among the margin period Tx, the margin distance Dx, and the object speed Vx is represented as (Vx=Dx/Tx), and when the object speed Vx is equal to the predetermined value (Dref/Tref) acquired by dividing the distance threshold Dref by the time threshold Tref, the first timing and the second timing are simultaneously reached. On the other hand, when the object speed Vx is more than the predetermined value (Dref/Tref), the first timing is reached earlier. Conversely, when the object speed Vx is less than the predetermined value (Dref/Tref), the second timing is reached earlier.

In the above, the driving support device according to this embodiment has been described, but the present invention is not limited to the above-mentioned embodiment, and various changes are possible within the range not departing from the object of the present invention.

For example, even in the case where the crossing object is detected, the alert may be inhibited under a state in which the necessity for the alert is low, e.g., a case where the distance between the own vehicle and the estimated crossing position Px is more than a predetermined distance, or a case where an estimated period required for the own vehicle to reach the estimated crossing position Px is more than a predetermined period.

Moreover, for example, according to this embodiment, the crossing object is detected by the ambient sensor 21 (radar sensor or camera sensor) installed on the own vehicle, but, in place of this configuration, an in-vehicle receiver configured to receive information (information on vehicles traveling on the road and the like) transmitted from a roadside device installed on the road as an infrastructure facility may be provided as the ambient sensor.

The roadside device is connected to a camera sensor, and is configured to acquire information on objects, e.g., vehicles and pedestrians existing on roads in the vicinity of the road side device and imaged by the camera sensor, and to repeat, at a predetermined cycle, transmission of information representing an intersection reference position, distances from the intersection reference position to the respective objects, road map information on the roads on which the objects are traveling, and the travel speeds and the like of the objects. Thus, travel paths (which corresponds to formation directions of the roads) of the objects on the road map can be estimated based on those pieces of information. Moreover, in this case, the travel path of the own vehicle can be calculated based on position information on the own vehicle and travel direction information on the own vehicle on the road map detected by a navigation device installed on the own vehicle.

Thus, the support ECU 10 can detect, as crossing objects, objects approaching the travel path of the own vehicle so as to cross this travel path out of the plurality of objects. Further, the support ECU 10 can acquire the estimated crossing position Px at which the travel path of the own vehicle and the travel path of the crossing object cross each other, and can calculate the margin distance Dx, which is the distance from the crossing object to the estimated crossing position Px, and the margin period Tx based on the travel speed of the crossing object and the margin distance Dx.

What is claimed is:

1. A driving support device, comprising:
object detection means for detecting an object approaching a travel path toward which an own vehicle is heading so as to cross the travel path;
alert means for alerting a driver of the own vehicle at a predetermined timing when the object is detected;
margin distance acquisition means for acquiring a margin distance representing a distance from a position of the object at a current time point to an estimated crossing position at which the object is estimated to cross the travel path toward which the own vehicle is heading;
travel speed acquisition means for acquiring a travel speed of the object;
margin period acquisition means for dividing the margin distance by the travel speed of the object, thereby acquiring a margin period representing an estimated period from the current time point to a time point at which the object reaches the estimated crossing position; and
alert timing determination means for selecting any one of a first timing at which the margin period becomes equal to or less than a time threshold and a second timing at which the margin distance becomes equal to or less than a distance threshold as the predetermined timing for the alert,
wherein the alert timing determination means is configured to select the first timing when a travel speed of the object is more than a predetermined value, and select the second timing when the travel speed of the object is equal to or less than the predetermined value, and
wherein the alert timing determination means comprises speed determination means for determining whether or not the travel speed of the object is more than a speed threshold equal to the predetermined value, and is configured to select the first timing as the predetermined timing when the travel speed of the object is determined to be more than the speed threshold, and select the second timing as the predetermined timing when the travel speed of the object is determined to be equal to or less than the speed threshold.

2. A driving support device according to claim 1, wherein the alert timing determination means is configured to select an earlier timing out of the first timing and the second timing as the predetermined timing.

3. A driving support device, comprising:
an object detection device which detects an object approaching a travel path toward which an own vehicle is heading so as to cross the travel path;
an alert device which alerts a driver of the own vehicle at a predetermined timing when the object is detected; and
circuitry configured to:
acquire a margin distance representing a distance from a position of the object at a current time point to an estimated crossing position at which the object is estimated to cross the travel path toward which the own vehicle is heading;
acquire a travel speed of the object;
divide the margin distance by the travel speed of the object, thereby acquiring a margin period representing an estimated period from the current time point to a time point at which the object reaches the estimated crossing position
select any one of a first timing at which the margin period becomes equal to or less than a time threshold and a second timing at which the margin distance becomes equal to or less than a distance threshold as the predetermined timing for the alert,
select the first timing when a travel speed of the object is more than a predetermined value, and select the second timing when the travel speed of the object is equal to or less than the predetermined value, and
determine whether or not the travel speed of the object is more than a speed threshold equal to the predetermined value, and select the first timing as the predetermined timing when the travel speed of the object is determined to be more than the speed threshold, and select the second timing as the predetermined timing when the travel speed of the object is determined to be equal to or less than the speed threshold.

4. A driving support device according to claim 3, wherein the circuitry is further configured to select an earlier timing out of the first timing and the second timing as the predetermined timing.

* * * * *